(12) United States Patent
Bjørkgård

(10) Patent No.: US 6,892,599 B2
(45) Date of Patent: May 17, 2005

(54) GEAR SHIFT DEVICE FOR VEHICLES

(75) Inventor: Sven Bjørkgård, Kongsberg (NO)

(73) Assignee: Kongsberg Automotive ASA, Kongsberg (NO)

( * ) Notice: Subject to any disclaimer, the term of this patent is extended or adjusted under 35 U.S.C. 154(b) by 39 days.

(21) Appl. No.: 10/181,254

(22) PCT Filed: Jan. 23, 2001

(86) PCT No.: PCT/NO01/00024
§ 371 (c)(1),
(2), (4) Date: Jul. 16, 2002

(87) PCT Pub. No.: WO01/55622
PCT Pub. Date: Aug. 2, 2001

(65) Prior Publication Data
US 2003/0000324 A1 Jan. 2, 2003

(30) Foreign Application Priority Data
Jan. 25, 2000 (NO) .............................. 20000377

(51) Int. Cl.$^7$ .......................... B60K 17/10; B60K 3/00; B60K 20/00; G05G 9/00
(52) U.S. Cl. .............................. 74/473.11; 74/473.18; 74/473.19; 74/473.3
(58) Field of Search ............................ 74/335, 473.11, 74/473.12, 473.18, 473.19, 473.3, 473.24

(56) References Cited

U.S. PATENT DOCUMENTS

| | | | | |
|---|---|---|---|---|
| 4,712,640 A | * | 12/1987 | Leigh-Monstevens et al. ... | 180/336 |
| 4,738,315 A | * | 4/1988 | Kinzenbaw ................ | 172/310 |
| 5,009,128 A | * | 4/1991 | Seidel et al. ................ | 477/122 |
| 5,056,376 A | * | 10/1991 | Moroto et al. ................ | 74/335 |
| 5,178,042 A | | 1/1993 | Moroto et al. | |
| 5,205,180 A | | 4/1993 | Moroto et al. | |
| 5,357,820 A | * | 10/1994 | Moroto et al. ................ | 74/335 |
| 5,481,877 A | * | 1/1996 | Bakke et al. ................ | 60/571 |
| 5,527,234 A | | 6/1996 | Kroeger | |
| 5,595,551 A | | 1/1997 | Hedström et al. | |
| 5,845,535 A | * | 12/1998 | Wakabayashi et al. ... | 74/473.18 |
| 5,861,803 A | | 1/1999 | Issa | |
| 6,209,410 B1 | * | 4/2001 | Suzuki .................... | 74/473.18 |
| 6,230,579 B1 | * | 5/2001 | Reasoner et al. ........ | 74/473.18 |
| 6,474,186 B1 | * | 11/2002 | Vollmar ...................... | 74/335 |

FOREIGN PATENT DOCUMENTS

| | | | |
|---|---|---|---|
| EP | 0 685 664 A2 | | 12/1995 |
| EP | 0 780 600 A1 | | 6/1997 |
| NO | 171426 | | 3/1993 |
| WO | WO 92/08914 | * | 5/1992 |

* cited by examiner

Primary Examiner—David A. Bucci
Assistant Examiner—Colby Hansen
(74) Attorney, Agent, or Firm—Finnegan, Henderson, Farabow, Garrett & Dunner, L.L.P.

(57) ABSTRACT

A gear shift device for vehicles with a mechanical, manually operable gearbox (9) for the vehicle (2). A gear level (1) is linked to the hydraulic master (55, 55', 56, 56') to respective slave cylinders (8, 18) for engagement or disengagement of gears during a manual mode of operation for the gear shift device. The gear level (1) is arranged to be brought from a position, wherein a gear is engaged, via a neutral or free position. By means of the gear level (1), the gear shift device can be brought into an automatic mode of operation (A). An electronic control device (44) is arranged to receive signals concerning a chosen mode of operation and driving parameter values. When an automatic mode of operation is chosen, the connection between the master cylinders (5, 15) and the slave cylinders (8, 18) is broken, and a connection is established between the control device (44) and the slave cylinders (8, 18) for automatic control of the slave cylinders.

6 Claims, 2 Drawing Sheets

GEAR SHIFT DEVICE FOR VEHICLES

BACKGROUND OF THE INVENTION

The invention relates to a gear shift device for vehicles with a mechanical, manually operable gearbox which is provided between an engine and driving wheels for the vehicle, wherein the gearbox can be operated by means of a gear lever, which is linked to a signal transmitter, which is connected via a transmission device to a signal receiver for movement of components of the gearbox for engagement or disengagement of gears, and the gear lever is arranged to be brought from a position wherein a gear is engaged, to a position wherein another gear is engaged, via a neutral position, i.e. a position wherein no gear is engaged.

Gear shift devices of the above-mentioned type are known from the prior art. For example, from NO 171426 a gear shift device is known, wherein the signal transmitter is composed of two hydraulic master cylinders, which can be operated by means of the gear lever. The connecting device comprises hydraulic lines, and the signal receiver comprises two hydraulic slave cylinders. The gear lever has a knob which can be moved along an H-shaped path with two parallel legs which are connected to a path portion extending across the legs. When the knob is moved along the transverse portion and one of the slave cylinders is operated by means of one of the master cylinders, it is moved from one leg to the other. The gears can be engaged by moving the knob from the transverse path portion to the ends of the respective legs. The second slave cylinder is hereby operated by the second master cylinder. When the knob is located on the transverse path portion, the engine is thereby not operationally connected to the driving wheels and this position of the knob can also be called a neutral position.

Furthermore, from U.S. Pat. No. 5,595,551 a mechanical, multistage, automatic gearbox is known, where the gear shift devices comprise an electronic control device which is arranged to receive signals from a number of sensors which measure driving parameters such as engine rotational frequency and power, vehicle speed, etc., and depending on the measurements determines which gear ratio is best and selects a corresponding gear. With such automatic gearboxes, moreover, a semi-automatic mode of operation may often be chosen, where, by operating an electrical switch, the vehicle's driver can select a gear, which is then engaged automatically, i.e. without special operation of a clutch pedal or accelerator, the gearbox and possibly the clutch being operated by an electronically controlled, mechanical device which performs the change of gear in the gearbox and the clutch. In the event of a failure in the electrical system or a failure of the mechanical device, a gearbox of this type cannot be operated, either in the automatic or the semi-automatic mode of operation.

BRIEF SUMMARY OF THE INVENTION

The object of the invention is to provide a gear shift device for a gearbox of the type mentioned in the introduction, where by means of the gear lever the vehicle's driver can choose between a manual mode of operation and an automatic mode of operation.

In the manual mode of operation gears are engaged by means of a gear lever via a mechanical, hydraulic or pneumatic device or a combination of such devices which connect the gear lever to the gearbox, and via which a desired gear can be engaged.

In the automatic mode of operation suitable gears are engaged in accordance with either engine and driving parameter values which have been measured by means of a number of sensors (wholly automatic mode of operation), or with information of signals which have been supplied by the driver by means of the gear lever (semi-automatic mode of operation), this information being transferred to an electronic control device which in turn effects the engagement of suitable gears.

By means of the device according to the invention the object can be achieved that the gearbox can be operated even in the event of an electrical failure of the components included in the device which provides the automatic shifting of gears or a failure of the electrical supply thereto.

Features characterising the gear shift device according to the invention will be apparent in the claims.

The invention will now be described in more detail with reference to the drawing which schematically illustrates an embodiment of a gear shift device according to the invention.

DETAILED DESCRIPTION OF THE INVENTION

Figure 1:
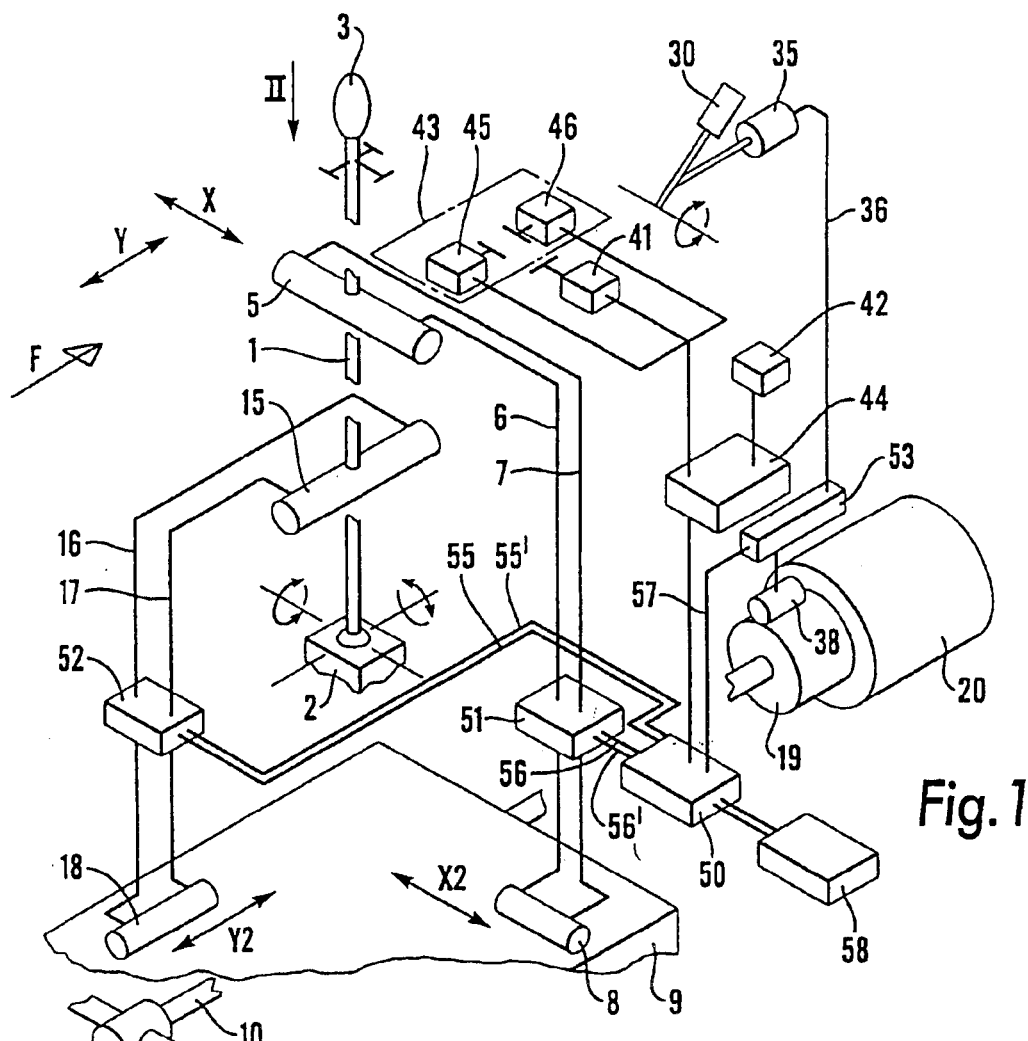
FIG. 1 is a schematic perspective view of a gear shift device and associated components, where portions have been cut away.

In connection with FIG. 1 in the description below, the term "up" should be understood to refer to the direction towards the edge of the drawing facing away from the reader, and the term "forward" should be understood as the direction of the arrow F, this direction also being understood to indicate the vehicle's longitudinal direction and direction of movement while driving forwards. The terms "right" and "left" should be understood to refer to the directions to the right and left respectively of a person looking in the direction of the arrow F. The term "transverse direction" should be understood to refer to a direction extending horizontally and across the longitudinal direction.

As illustrated in FIG. 1, the gear shift device comprises a gear lever 1 whose lower end is linked to a chassis 2 of a vehicle (not shown), and whose upper end is provided with a knob 3.

The gear lever 1 is connected to a first, double-acting hydraulic master cylinder 5 which extends in the transverse direction and which is connected via hydraulic lines 6 and 7 with a first, double-acting slave cylinder 8 which is mounted on a gearbox 9, and which similarly extends in the transverse direction. The gear lever 1 is further connected with a second, double-acting hydraulic master cylinder 15 which extends in the longitudinal direction and which is connected via hydraulic lines 16 and 17 with a second, double-acting slave cylinder 18. The slave cylinder has pistons (not shown) which are connected with components of the gearbox which by means of movement of the pistons effect engagement or disengagement of gears.

The first master cylinders 5, 15 form a signal transmitter, which via the lines 6,7,16,17 which constitute a transmission device, transmits signals to the slave cylinders 8,18, which constitute a signal receiver. It will be appreciated that other devices may be employed for transmitting information from a gear lever to the gearbox. For example, instead of hydraulic components as signal transmitters, transmission devices and signal receivers, pneumatic or mechanical devices such as bell cranks, rods, wire ropes, etc. may be employed.

The gearbox 9 is connected to an engine 20 via a clutch 19, and connected to the driving wheels 12 of the vehicle via a number of shafts 10, 11.

Figure 2:
FIG. 2 is a view schematically illustrating a path of movement of a knob of a gear lever during gearing with the gear shift device according to the invention, this path being obtained by viewing the gear lever from above, i.e. in the direction of the arrow II.

As also illustrated in FIG. 2, the gear lever's knob is arranged to be moved backwards and forwards in a path comprising a number of path portions 21,22,23,24,25 in the direction of the double arrow Y, which also indicates the longitudinal direction, and in a path portion 26 in the direction of the double arrow X which also indicates the transverse direction. The resulting movement of the slave cylinders 8,18 is indicated by the double arrows X2 and Y2 respectively.

When the gear lever knob 3 is moved along the path portion 26, only the first master cylinder 5 and the associated slave cylinder 8 are operated. The knob hereby passes adjacent, first ends of the longitudinal path portions 21–25 without any components being moved which effect an engagement of gears in the gearbox. The gearbox is therefore constantly in a neutral position.

If the gear lever knob 3, after having been moved to the first end of one of the longitudinal path portions 21–25 when the first master cylinder 5 is operated, is moved to the other end of this path portion when the second master cylinder 15 and the associated slave cylinder 18 are operated, one of four gears G1–G4 for moving the vehicle forward, or a gear R for moving the vehicle backwards can be engaged.

While engaging the gears, the driver operates in the usual manner a clutch pedal 30, which is connected to a third, single-acting hydraulic master cylinder 35. This master cylinder 35 is connected via a hydraulic line 36 to a third, single-acting hydraulic slave cylinder 38 for disengaging and engaging the clutch 19.

With manual gearboxes, servo devices (not shown) may be provided in the known manner to assist the driver during engagement or disengagement of the gears by means of the gear lever and for operation of the clutch. With the device according to the invention, a servo device of this kind may, for example, be connected to each slave cylinder. The servo device may then comprise a pneumatic cylinder which, when a gear has to be engaged, can be supplied with compressed air from a compressed air source in the vehicle, thus helping to facilitate the engagement of the gear. When using such servo devices, however, there will still be a need to exercise a relatively great amount of muscle power in order to perform gear changes or operation of the clutch.

If servo devices are used in connection with the device according to the invention, it should be understood that these too can be operated even in the event of an electrical failure as mentioned above.

As illustrated in FIG. 2, the gear lever 3 can be moved transversely in the direction of the double arrow X to one end of the transverse path portion 26, to a position A. In this position, the gear lever or a component which is moved together with it, influences a first sensor device 41, which is arranged to transmit a signal to a preferably electronic control device 44 for implementation of an automatic operation of the gearbox 9.

A second sensor device 42 is also provided which is arranged to measure values of driving parameters on which an automatic gear shift may depend, such as engine rotational frequency and power, vehicle speed, etc. and to transmit corresponding signals to the control device 44.

There is further provided a third sensor device 43 comprising a sensor 45 which can be influenced when the knob is moved transversely backwards from the position A to a position A−, and a sensor 46 which can be influenced when the knob is moved forwards from the position A to a position A+.

Based on signals received from the sensor devices 41–43 the control device 44 is arranged to transmit electrical signals to a setting device 50.

The setting device 50 is arranged to control the supply of a hydraulic pressure fluid via hydraulic lines 55,55',56,56', 57 to a first, second and third valve device 51, 52 and 53 respectively from a hydraulic unit 58.

The valve devices 51,52,53 are inserted in the hydraulic lines 6,7,16,17,36 between the master cylinders 5,15,35 and the respective slave cylinders 8,18,38 and are arranged to break a connection or re-establish a broken connection between the master cylinders and the slave cylinders. Furthermore, the valve devices 51,52,53 are arranged to control the supply of hydraulic fluid to the slave cylinders 8,18,38 via the setting device 50 from the hydraulic unit 58 for operation of the slave cylinders according to signals transmitted by the control device 44 to the setting device 50. It will be understood that the control device 44 may be an electronic computer which may be provided with a suitable computer program for controlling valves of the valve devices 51,52,53, with the result that the slave cylinders 8,18,38 effect engagement of the appropriate gears during appropriate operation of the clutch.

It will also be understood, however, that there may be provided in the known per se manner additional sensors (not shown) which are arranged to provide values of additional parameters concerning, e.g., the rotational frequency of shafts in the gearbox, the torque transmitted by these shafts, etc. Values of these parameters may be supplied to the control device 44, which automatically effects an engagement of gears, e.g. when shafts which have to be connected have the same rotational frequency and are not transmitting any torque, thus eliminating the need for operation of the clutch in the automatic mode of operation. Components such as a valve device 53 and a hydraulic line 57 for automatic operation of the clutch may then be omitted.

The setting device 50 and the valve devices 51,52 and possibly 53 are arranged to break the connection between the master cylinders and the slave cylinders and to control hydraulic fluid from the hydraulic unit to the slave cylinders depending on signals from the control device for automatic engagement of gears. In what follows, however, only the assembly comprising the valve devices 51,52 for breaking the connection between the slave cylinders 8,18 and the master cylinders 5,15 via the lines 55,55',56,56' for engaging gears will be described as a switch device.

Figure 3:
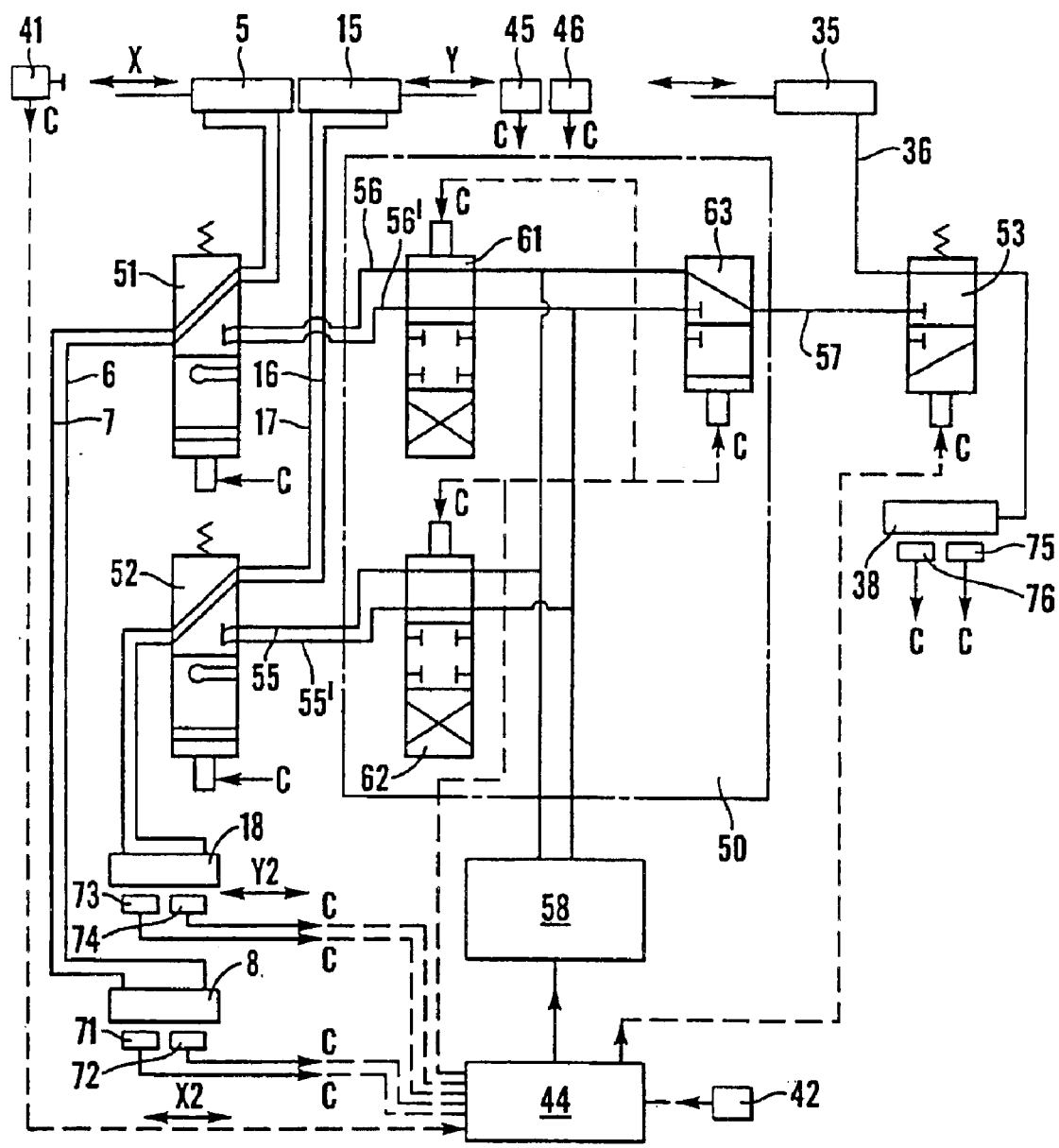
FIG. 3 is a connection diagram schematically illustrating an embodiment of a control device and components which are controlled thereby.

FIG. 3 is a connection diagram illustrating the interconnection of components of the device according to the invention, where a person skilled in the art will understand the mode of operation of the components based on this diagram, and where the reference numerals indicate components which have been described above.

FIG. 3 illustrates the first master cylinder 5 which is arranged to influence the first sensor 41, which, as indicated by the letter C, an arrow facing away from the sensor and by broken lines, is arranged to transmit a signal to the control device 44 when the sensor 41 is influenced by the gear lever in its position A. There is further illustrated a second master cylinder 15, which is arranged to influence the sensors 45 and 46, which in turn are similarly arranged to transmit signals to the control device 44, as indicated only by the letter C and arrows.

In the pairs of hydraulic lines 6,7 and 16,17 connecting the master cylinders 5,15 with the slave cylinders 8,18, there is inserted a first valve device 51 and a second valve device 52 respectively.

In the hydraulic line 36 connecting the clutch master cylinder 35 with the clutch slave cylinder 38 there is inserted a third valve device 53.

The valve devices are spring-loaded to a position wherein they create a connection between the master cylinders and the slave cylinders. Should the power supply fail, gears can thus be engaged manually.

In the setting device there are provided a first, second and third adjustment valve 61,62 and 63 respectively, whereby a pressure fluid can be conveyed from a hydraulic unit 58 to the valve devices 51,52 and 53. These setting valves 61,62, 63 can be controlled by the control device 44 via electrical wires, as indicated by broken lines and arrows.

When the valve devices 51,52 in the lines 6,7,16,17 have been brought into a position, wherein they break the connection between the master cylinders and establish a corresponding connection with the first and the second adjustment valves 61,62, by means of an appropriate operation of the setting valves 61,62 a desired movement of the slave cylinders 8,18 can be achieved for automatic engagement of gears. The setting valves 61,62 can hereby be controlled by the setting device 44 via electrical wires which are indicated by broken lines.

If the gearbox is arranged to be operated by a gear lever which can be moved in an H-like pattern with several pairs of legs, it must be possible to stop the first slave cylinder 8 at several points between the ends of its full stroke. For this purpose there may be provided a number of position sensors 71,72, two of which are illustrated, at these points. When this slave cylinder's piston has reached one of these points, the sensor at the point concerned can transmit a signal to the control device 44, which in turn transmits a signal to the setting valve 61 to stop the supply of hydraulic fluid to this slave cylinder.

In the same way, in order, e.g., to restrict their strokes, a number of position sensors 73,74 and 75,76 respectively may be provided for the second slave cylinder 18 and the third slave cylinder 38, two sensors being illustrated for each master cylinder.

Since the clutch slave cylinder 38 is single-acting, there is a need for only one line to the associated valve device 53 which can be connected alternately to a pressure line and a return line from the hydraulic unit 58.

The mode of operation of these valve devices is otherwise evident from the standard symbols employed in FIG. 3.

When the vehicle is stationary and the driver wishes to set it in motion backwards, he can disengage the clutch by means of the clutch pedal and select the gear R, as illustrated in FIG. 2, whereupon he engages the clutch in the same way as in a manual mode of operation for the gearbox and the clutch.

When the vehicle is stationary and the driver wishes to set the vehicle in motion forwards, he can disengage the clutch and select the gear G1.

If the driver wishes the gearbox to continue working in manual mode of operation, he can then change gear in the same way as is normal for manual gearboxes by selecting the gears G2–G4 as desired.

If, after having set the vehicle in motion forwards, the driver wishes the gearbox to function in automatic operation mode, he moves the gear lever knob 3 to the position A, thus influencing the first sensor device 41.

The sensor device 41 then transmits a signal to the control device 44 which in turn transmits a signal to the setting device 50 for breaking the connection between the master cylinders 5,15,35 and the respective slave cylinders 8,18,38. The control device 44 then undertakes the selection of gear depending on the driving parameters.

By moving the knob 3 forward to the position A+ or A−, thereby influencing either the sensor 46 or the sensor 45, the gear shift device is transferred to a semi-automatic mode of operation, where by means of repeated movement of the knob between A and A+ successive gear shifts are obtained to progressively higher gears every time the knob reaches the position A+ until the knob, for example, remains in this position. In the same way, successive gear shifts are obtained to progressively lower gears when by means of repeated movement the knob is moved between A and A− and the knob reaches the position A−, until the knob remains in this position.

Should the driver wish to operate the gearbox manually, at any time during the wholly or semi-automatic mode of operation he can move the knob to the portion of the transverse path portion 26 located on the left of the position A.

The connection is thereby broken with the sensor 41 which transmits a corresponding signal to the control device 44. The control device 44 then effects a re-establishment of the connections between the master cylinders 5,15,35 and the slave cylinders 8,18,38, thus permitting a manual operation of the gearbox and the clutch.

What is claimed is:

1. A gear shift device for vehicles with a mechanical, manually operable gearbox which is provided between an engine and driving wheels for the vehicle, wherein the gearbox can be operated by means of a gear lever, said gear shift device comprising: a signal transmitter linked to the gear lever and which comprises two double-acting hydraulic master cylinders which are connected via a transmission device which comprises two pairs of hydraulic lines which are connected to respective master cylinders, to a signal receiver which comprises two double-acting hydraulic slave cylinders, for movement of components of the gearbox for engagement or disengagement of gears, and the gear lever is arranged to be brought from a position wherein a gear is engaged, to a position wherein another gear is engaged, via a neutral position wherein no gear is engaged, and further comprising a first sensor device which, when the gear lever is moved away from the neutral position to a fixed position at a distance from the neutral position or from this position to the neutral position, is arranged to establish a choice as to whether the gearbox should be operated automatically or manually, a second sensor device which is arranged to establish driving parameters on which a gear selection may depend, an electronic control device, which is arranged to receive signals from the sensor devices concerning a chosen mode of operation and values of the driving parameters, and valves for breaking the connection between the hydraulic master cylinders and the hydraulic slave cylinders via the hydraulic lines and establishing a corresponding connection between the control device and the hydraulic slave cylinders, or vice versa, where the control device is arranged to transmit a signal to the valves either a) for breaking the connection between the hydraulic master cylinders and the hydraulic slave cylinders and to transmit signals to the hydraulic slave cylinders for automatic engagement of gears when the automatic mode of operation has been chosen, or b) for establishing the connection between the hydraulic master cylinders and the hydraulic slave cylinders for manual engagement of gears when the manual mode of operation has been chosen.

2. A gear shift device according to claim 1, wherein the gear shift device is arranged to be operated in a semi-automatic mode of operation, a third sensor device being provided which is arranged to be influenced by the gear lever while at the same time the gear lever influences the first sensor device, in order to indicate a desired gear selection, where the third sensor device is arranged to transmit corresponding electrical signals to the control device for engagement of a desired gear.

3. A gear shift device according to claim 2, wherein successive gears can be selected during the semi-automatic mode of operation by moving the gear lever in one direction to a position wherein it influences the first sensor device and the choice of the automatic mode of operation, and corresponding successive movements of the gear lever transversely relative to this direction, from and towards this position in order to influence the third sensor device.

4. A gear shift device according to claim 1, further comprising a setting device and a hydraulic unit, the setting device arranged to control the supply of a hydraulic pressure fluid to the valves from the hydraulic unit.

5. A gear shift device according to claim 4, wherein the valves are arranged to control the supply of hydraulic fluid to the slave cylinders via the setting device from the hydraulic unit for operation of the slave cylinders according to signals transmitted by the control device to the setting device.

6. A gear shift device according to any one of claims 1, 2, 3, 4 and 5, where the gear lever has a knob, which is arranged to be moved in an H-like path or a path with several assembled H-like paths with parallel legs and a path portion extending across and between the legs, where the neutral position has been selected when the knob is located on the transverse path portion, and a gear has been selected when the knob is located at one end of a leg, wherein the first sensor device is influenced when the knob is located at one end of an extension of the transverse path portion.

* * * * *